Patented July 28, 1942

2,291,529

UNITED STATES PATENT OFFICE 2,291,529

FLOUR METHOD

Fred S. Carbon, Buchanan, Mich.

No Drawing. Application April 20, 1940,
Serial No. 330,700

3 Claims. (Cl. 99—94)

This invention relates to flour and the method of making the same, and more particularly is directed to a flour composition especially adapted for use in baking pancakes, waffles, doughnuts, pastry, cakes and the like.

The present application is a continuation in part of my copending application, Serial No. 232,846, filed October 1, 1938.

In the art of making flour of the type specified above, numerous attempts have heretofore been made to incorporate a malt flavor thereinto. However, all such attempts with which I am familiar have not been satisfactory, due mainly, I believe, to the fact that malt flour has been used and incorporated directly into wheat or buckwheat flour with certain amounts of salt and sugar added. Malt flour is a flour made by germinating wheat flour to build up its diastatic activity, then drying and milling the grain into a finely divided flour. As a result, the malt flour so produced has a large percentage of diastase or starch, and any appreciable amount added to a baking flour mixture is so starchy as to render the mixture objectionable. Also, the malt flour, if used in any proportion sufficient to assure a malt flavor in the finished product, produces an offensive odor in cooking, and renders the resulting product indigestible to an appreciable degree.

Therefore, in the past, the use of malt flour as an ingredient in a flour composition has been limited, and I have found that the use of over 2% of such flour produces a highly indigestible product having an offensive odor in cooking. Further, unless considerably more than 2% by weight of malt flour is employed, the improvement in flavor is negligible, and thus the limitations of such previous compositions have rendered them commercially impracticable.

A further consideration is the fact that malt is hygroscopic in character, and if exposed to moisture, rapidly cakes into hard masses which cannot readily be broken up. As a result, the mere addition of malt flour to a flour composition, if in appreciable quantities sufficient to obtain the flavor benefits, results in a product which, once the package or container is opened, rapidly cakes up and cannot be used after a short period of time.

Recognizing these limitations as the recondite causes for commercially unsuccessful malt flour mixtures heretofore prepared, I have developed a malt flour composition containing a relatively high percentage of malt, which is readily digestible, has the desired flavor attributes, and yet, when prepared according to the present invention, has none of the disadvantages of previous compositions heretofore developed.

One of the primary objects of the present invention is to provide a flour composition having a very pleasant malt flavor, which upon baking produces a pleasing aroma, and results in a light, readily digestible product having all the advantages of the malt ingredient with none of the attendant disadvantages.

Another object of the present invention is to produce a malted flour composition which can be exposed to air without the danger of caking or becoming lumpy.

Still another advantage secured by the present invention is the production of a malted flour which can be packaged and distributed in ordinary cardboard packages without any danger of losing either its fineness of texture or its aroma and flavor characteristics.

I have found, after extensive experimentation, that malt flour cannot be used as an ingredient in such flour compositions, but that the desired results can be secured only by the use of powdered malt extract, such as that commercially known as "Spray malt," now used extensively as a base in the ice cream industry, which must be mixed with the desired flour composition in a particular manner under certain predetermined conditions.

Powdered malt extract, which has only been developed in the last fifteen to twenty years, is made by sprouting barley kernels, then pulping the same to obtain a heavy syrup. This syrup is then processed in a manner similar to that used in making powdered milk, being dried, heated and thoroughly powdered to produce the desired finely powdered malt particles. The resulting powdered malt extract, however, is still highly hygroscopic in character. It differs from malt flour essentially in the fact that it contains a relatively high amount of maltose and dextrin, and little or no starch. As a result, when baked in a flour mixture, the cell structure produces a relatively light, stiff candy-like shell, which has a very pleasing flavor and is readily digestible. Preferably, the powdered malt extract which I employ is a non-diastatic product having from 75 to 85% sugars therein, such as maltose and the like, with from 1 to 4% moisture.

In preparing flour mixes according to the present invention, I have found that to secure the desired malt flavor and digestibility attributes, an appreciable greater amount of the malt ingredient must be employed than was heretofore possible. By employing the disclosure of the present invention I am able to use from 3% to 16% by weight of the malt ingredient, which is far greater than any previous malt flour mix with which I am familiar. The most desirable percentage, from the standpoint of flavor, aroma and digestibility, lies in the range of from 5% to 10% by weight of powdered malt in the final composition.

It is, however, of extreme importance that the mixture be prepared in a certain manner under certain predetermined conditions, because of the hygroscopic character of the malt and its tendency to agglomerate and lump when exposed to air. Therefore another feature of the present invention is the method in which the mixture is prepared.

For purposes of illustration, I shall now describe the manner of preparing a malted pancake flour composition according to my invention. The final composition is as follows:

| | | |
|---|---|---|
| Wheat flour | pounds | 100 |
| Buckwheat flour | do | 37½ |
| Cornmeal | do | 50 |
| Powdered malt | do | 17 |
| Bicarbonate of soda | do | 4 |
| Salt | do | 6¾ |
| Phosphate | do | 5 |
| Powdered skim milk | do | 2½ |
| Sugar | do | 2½ |
| Vanillin | ounces | 4 |

This results in a composition having approximately 7½% by weight of powdered malt extract. The above composition can be used with the malt increased up to approximately 40 pounds, and still retaining the desired characteristics, altho the malt flavor, of course, becomes more pronounced.

In mixing the composition, I find that I must first provide a mixing condition in which the temperature and humidity conditions are accurately controlled. The mixture will not be satisfactory unless the moisture content of the mixing atmosphere is kept below predetermined limits. I find that under conditions where the room temperature is at or above 80° and the relative humidity maintained at or below 30% the most satisfactory results are obtained. When the relative humidity increases to any appreciable extent, the mixture is unsatisfactory and a homogenous product does not result.

In addition to maintaining proper temperature and humidity conditions, however, I find that it is essential that the mixing itself be carried out in a particular manner. My method, which I have found eminently satisfactory, consists in first placing the wheat and buckwheat flour, and the cornmeal in an agitator. This mixture is then thoroughly agitated until the entire mass is completely admixed and is in a state of partial suspension in the agitator. The powdered malt is then sprayed or sifted in at a relatively slow rate while the agitation is continued. As the separate particles of powdered malt therefore enter the agitator they are out of contact with each other, and enter into the flour mixture at relatively widely spaced points well separated from each other.

Apparently, with this method of mixing, the individual malt particles become immediately coated with a layer of fine flour dust, due to their hygroscopic character, before they have an opportunity of contacting an adjacent malt particle. This coating seems to isolate the malt particle to an extent such as to render its caking action negligible, and due to the wide dispersal of the particles throughout the mixture, they do not have a chance to agglomerate with each other prior to being thus coated. Once coated, they become practically inactive so far as future agglomeration is concerned, probably due to the fact that the moisture absorbed from the flour coating is sufficient to offset the hygroscopic characteristics. As a result, a perfectly homogeneous mixture is provided, with the coated malt particles dispersed evenly therethrough.

The other ingredients are then added in a similar manner, until the composition is complete. I have found that it is then desirable to age the composition for from six to twelve hours under continuance of the same conditions of temperature and humidity. This ageing is of distinct advantage as it seems to set the coated malt particles so that when subsequently packaged they do not have any tendency to lump or cake in the package, even when the package is subsequently opened and exposed under different conditions.

It seems, therefore, that to produce a commercially practical malted flour composition of this character, it is essential, first, that powdered malt be used in place of malt extract flour; second, that the mixing be done under certain conditions of temperature and humidity; third, that the method of mixing be carried out in such manner that the mixture is immunized from the hygroscopic action of the powdered malt particles by the coating of flour dust thereover; and, fourth, that the mixture be aged for an appreciable period before packaging.

The resulting product, when baked, produces a very pleasing aroma, a malt flavor which is highly desirable, and a texture which has light cellular structure with no starch, giving increased risibility and digestibility. Also, the composition is not subject to caking or becoming lumpy when stored and/or exposed to normal atmospheric conditions.

I am fully aware that a number of modifications of the present invention are possible both in the variation of the composition itself and in the method of mixing the same, without in any manner departing from the underlying principles which I have disclosed, and I therefore do not intend to be limited except as defined by the scope and spirit of the appended claims.

I claim:

1. The method of preparing pancake and waffle flour which comprises, thoroughly agitating a mixture of wheat flour, buckwheat flour and cornmeal continuing said agitation while slowly introducing and dispersing not over a 16% concentration of non-diastatic powdered malt extract particles into said mixture at a rate such that each individual particle is immediately coated with flour as it enters the mixture to prevent agglomeration of said particles in said mixture, and continuing said agitation to provide uniform dispersal of said particles throughout said mixture while maintaining a temperature of not less than 80° F. and a relative humidity of not more than 30%.

2. The method of claim 1 further characterized by the step of ageing said final mixture under said atmospheric conditions for a period of at least six hours.

3. In the method of preparing a pancake and waffle flour having malt therein in a quantity exceeding 3% but not over 16% by weight, the novel step which comprises introducing non-diastatic powdered malt extract into a mixture of flour during complete agitation of said flour at a rate such that the individual malt particles are relatively widely dispersed as they enter the mixture to pick up individual coatings of flour dust immunizing the mixture against the hygroscopic action of said particles, and maintaining a temperature of not less than 80° F. and a relative humidity of not more than 30% during said agitation.

FRED S. CARBON.